(12) United States Patent
Sternbach et al.

(10) Patent No.: US 7,051,953 B2
(45) Date of Patent: May 30, 2006

(54) NOZZLE DEVICE

(75) Inventors: Arndt Sternbach, Bietigheim-Bissingen (DE); Mark M. Benner, Lake Orion, MI (US)

(73) Assignee: Valeo Systems d'Essuyage (FR)

( * ) Notice: Subject to any disclaimer, the term of this patent is extended or adjusted under 35 U.S.C. 154(b) by 276 days.

(21) Appl. No.: 10/450,980

(22) PCT Filed: Dec. 13, 2001

(86) PCT No.: PCT/EP01/14637

§ 371 (c)(1),
(2), (4) Date: Jun. 18, 2003

(87) PCT Pub. No.: WO02/49769

PCT Pub. Date: Jun. 27, 2002

(65) Prior Publication Data

US 2004/0074988 A1 Apr. 22, 2004

(30) Foreign Application Priority Data

Dec. 20, 2000 (DE) ................................ 100 63 529

(51) Int. Cl.
*B05B 1/10* (2006.01)

(52) U.S. Cl. ................ 239/284.1; 239/284.2; 239/598; 239/597; 239/463; 239/492; 239/499

(58) Field of Classification Search ............. 239/284.1, 239/284.2, 601, 598, 597, 472, 463, 474, 239/492, 494, 496, 499; 15/250.001–250.003
See application file for complete search history.

(56) References Cited

U.S. PATENT DOCUMENTS

| | | | | |
|---|---|---|---|---|
| 2,969,187 A | * | 1/1961 | Vicard | 239/214.25 |
| 3,911,858 A | * | 10/1975 | Goodwin | 116/137 A |
| 4,052,002 A | * | 10/1977 | Stouffer et al. | 239/4 |
| 4,717,076 A | * | 1/1988 | Notkin | 239/467 |

FOREIGN PATENT DOCUMENTS

| | | |
|---|---|---|
| DE | 114637 | 11/1900 |
| DE | 1655048 | 7/1971 |
| DE | 4422590 | 1/1996 |
| GB | 2122920 | 1/1984 |

* cited by examiner

*Primary Examiner*—Dinh Q. Nguyen
(74) *Attorney, Agent, or Firm*—Young & Basile, P.C.

(57) ABSTRACT

A nozzle device for ejecting a liquid onto vehicle windows or headlight lenses. At least one rotation chamber is formed inside a nozzle body. The liquid enters the chamber, is rotationally displaced in such a way that it is then ejected as a homogeneous fan jet via at least one slit-like nozzle opening.

20 Claims, 1 Drawing Sheet

NOZZLE DEVICE

BACKGROUND OF THE INVENTION

The invention relates to a nozzle device for distributing or dispensing fluid and in particular to a nozzle device to distribute washer fluid on vehicle windows or lenses of vehicle headlights.

Vehicles windows in the sense of the invention are preferably, but not exclusively, vehicle windshields or rear windows.

Nozzle devices for discharging and distributing washer fluid, specifically water, usually with detergent and/or anti-freeze additives, are known in numerous embodiments. In particular, nozzle devices are also known whose nozzles or nozzle openings are formed by nozzle slits, specifically for generating a fan-shaped fluid jet (for example, DE 299 948 U1). The intent of a fan jet of this kind is to achieve the broadest possible distribution of the washer or cleaning fluid on the vehicle window for the purpose of increasing the cleaning effect.

In the known nozzle devices, the particular nozzle slit is positioned so that the fan jet makes contact with the vehicle window with its greater cross section horizontal, or more or less horizontal.

The object of the invention is to demonstrate a nozzle device for improved cleaning effect.

SUMMARY

In the nozzle arrangement in accordance with the invention, the cleaning fluid is set in rotation after it enters the rotation chamber, and thereby a homogenization of the fan-shaped fluid jet exiting the nozzle slit is achieved in such fashion that the jet has an essentially constant jet thickness in the longitudinal extension of the nozzle slit.

BRIEF DESCRIPTION OF THE DRAWING

The invention is explained in the Figures in greater detail in the following from the example of one aspect of the invention.

DETAILED DESCRIPTION

Figure 1:
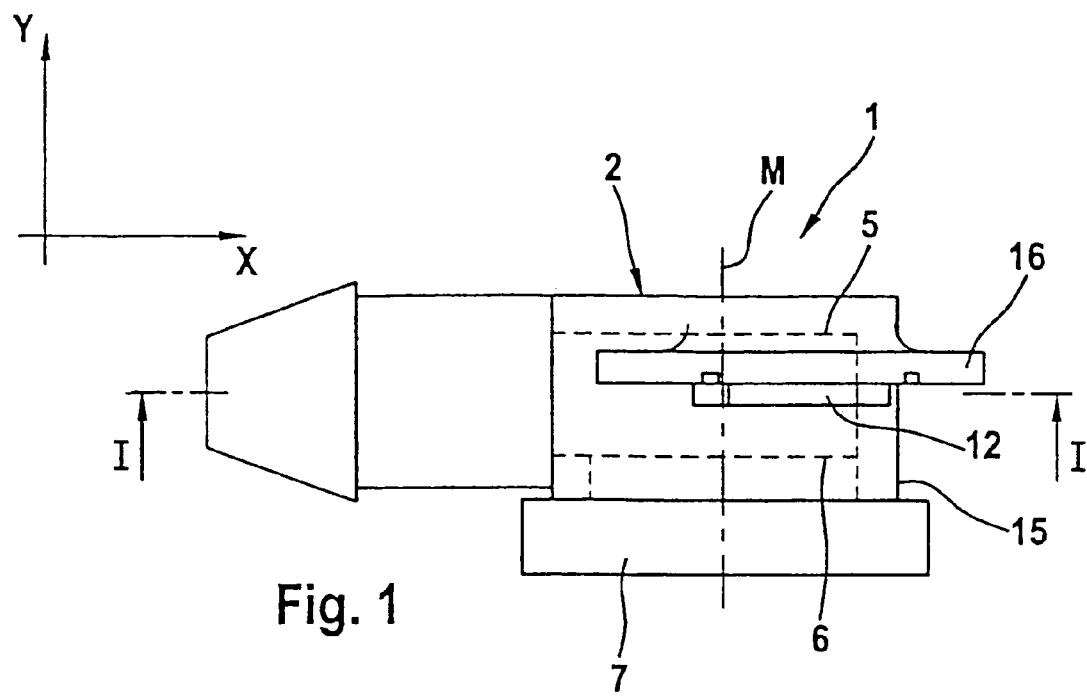
FIG. 1 shows in a side view a nozzle device according to the invention, specifically for use as a washer nozzle for vehicle windows (e.g. vehicle windshields or rear windows) or for lenses of vehicle headlights.
Figure 2:
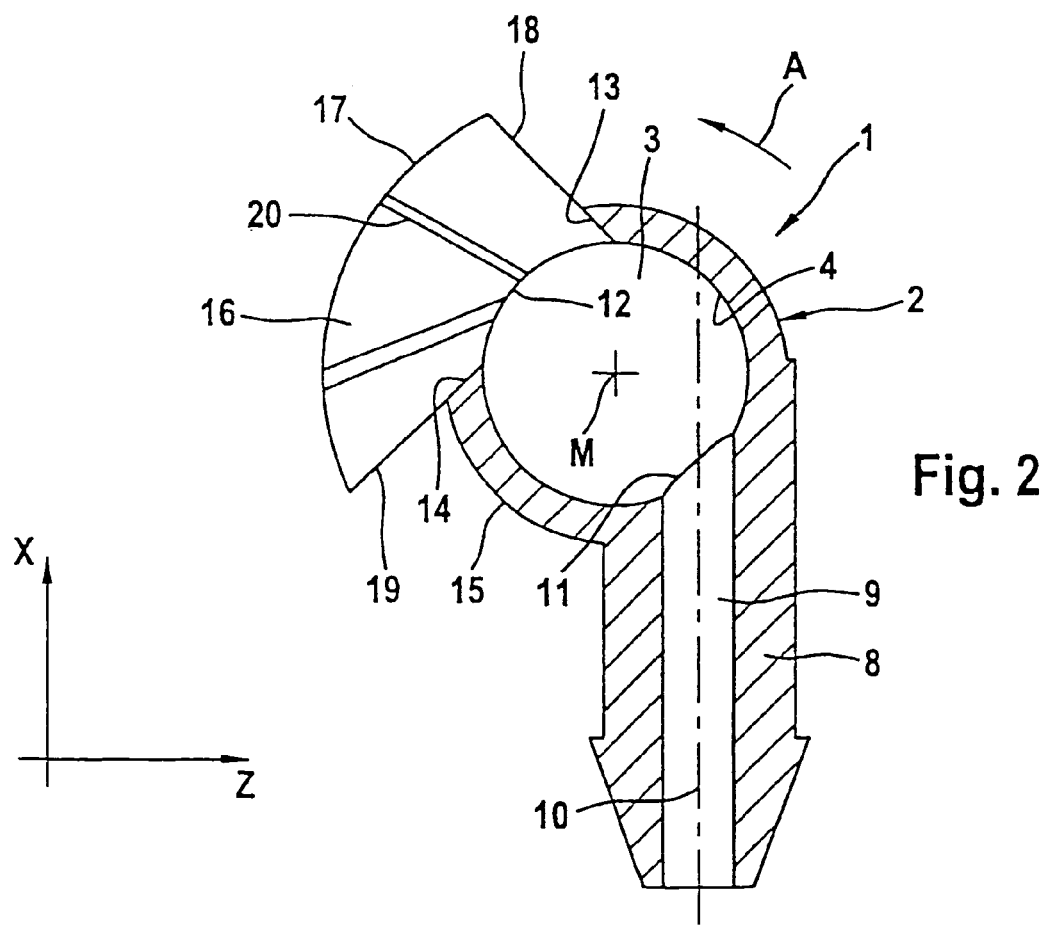
FIG. 2 shows a section corresponding to the line I—I of FIG. 1.

For a better understanding and for the sake of simplification, the three spatial axes running perpendicular to each other are given in FIGS. 1 and 2 as X, Y and Z.

The nozzle device generally identified with the reference numeral 1 is produced as a molded part in the aspect shown, for example, as an injection molded part made from a suitable material, for example, plastic. The nozzle device 1 comprises a nozzle body 2 which forms a chamber 3 in its interior. The chamber 3 has a circular cylindrical inner surface 4 which runs concentrically with a center axis or axis of rotation M parallel to the Y-axis.

On each of its sides which are spaced apart in the direction of the Y-axis, the chamber 3 is closed off by a planar floor indicated in FIG. 1 by the broken line 5 or 6, where the plane of these floors lies perpendicular to the Y-axis in the embodiment shown.

The lower floor 6 in FIG. 1 is formed by the inner face of an end piece 7 which is inset into the nozzle bodies 2, or into the open side of a recess forming the chamber 3, and is affixed to the nozzle body 2 in a suitable manner.

A sleeve-like connection 8 is formed on the nozzle body 2, with which the nozzle device 1 can be connected to a supply, not shown, for example, to a hose for supplying a fluid, e.g. washer fluid (an example of which is water with detergent and/or anti-freeze additives). A passage is formed in the connection 8, the axis of which passage lies parallel to the X-axis and thus also parallel to the X-Z plane and which, referenced to the peripheral or inner surface of the chamber 3, opens tangentially into the chamber.

In the aspect shown, the configuration is further formed so that the distance between the two floors 5 and 6 is the same, or about the same, as the diameter of the passage 9, and the axis 10 of the passage 9 is at a distance from the center axis M which is equal to half the diameter of the chamber 9 minus half the diameter of the passage 9, so that the passage 9 lies with its right boundary in the sectional drawing 2 tangentially or more or less tangentially to the peripheral surface 4. The passage 9, whose axis 10 lies parallel to the X-axis in FIGS. 1 and 2, has a constant cross section over its entire length.

As FIG. 2 in particular shows, the diameter of the chamber 3 is considerably greater than the diameter of the passage 9 and thus also of the opening of this passage into the chamber 3.

Offset opposite the opening 11 around the center axis M in a circumferential direction A, provision is made for a continuous nozzle slit, that is, the slit passes from the outside of the nozzle body 2 into the chamber 3, which slit extends over a considerable angular range around the axis M, and in the aspect shown more or less over an angular range of 90°, and its longitudinal extent lies parallel to the X-Z plane. Referenced to their respective centers, the opening 11 and the nozzle slit 12 in the aspect shown are offset to each other over an angular range around the axis M, which angle is greater than the angular length of the nozzle slit 12 and in the aspect shown is about 180°.

In the aspect shown, the nozzle slit 12 is bounded on its long sides by surfaces which lie parallel to the X-Z plane and at both ends by surfaces 13 and 14 which lie on a plane which includes an angle with an imaginary plane running radially through the center axis M, specifically such that in the assumed circumferential direction A, the transition of each surface 13 and 14 to the inner circumferential surface 4 has a smaller angular distance from the opening 11 than the outer transition of each surface 13 and 14 to the outer surface 15 of the nozzle body 2.

In the area of the nozzle slit 12, a plate-like or segmental projection 16 is molded onto the nozzle body 2, which lies parallel to the X-Z plane with its surface sides and with one surface flush with one longitudinal side of the nozzle slit 12, specifically in the aspect shown flush with the longitudinal side of the nozzle slit 12 distal from the end piece 7. The projection 14 protruding beyond the outer surface 15 extends over the entire angular length of the nozzle slit 12, where the outer edge 17 of the projection 16 describes an arc around the center axis M, and each of the inward running edges 18 and 19 lies in a common plane with the boundary 13 (edge 18) or with the boundary 14 (edge 19). The width of the nozzle slit 12 in the aspect shown is smaller than the distance between the floors 5 and 6. In the aspect shown, the nozzle body 2 is also configured essentially on its outer surface 15 as a circular cylinder.

The projection 16 is profiled on the surface side facing the nozzle slit, meaning that in the aspect shown it is furnished with groove-like channels which extend from the nozzle slit 12 outward in a direction of the outer edge 17. This profiling serves to modify the fan-shaped fluid jet emerging from the nozzle slit. Other profiles to modify the jet are also conceivable.

When in use, the nozzle device 1 is supplied through the connection 8 with a fluid under pressure, for example, washer fluid, which then enters the chamber 3 through the passage 9 and finally emerges as a fan-shaped jet from the nozzle slit 12 radially to the center axis M. As a result of the tangential issuance of the passage 9 into the chamber with its circular cylindrical inner surface, a fluid stream or turbulence is generated inside the chamber, which stream rotates about the center axis M in the circumferential direction A. As a result of the pressure of the fluid supplied and specifically of the centrifugal forces exerted on the fluid particles by the turbulence, a homogenization of the fan-shaped fluid jet emerging from the nozzle slit 12 is achieved such that an essentially constant jet thickness is also achieved in the X-Z plane, that is in the plane of the longitudinal extension of the nozzle slit 12. The fan-shaped fluid jet can be modified additionally regarding its jet thickness by the wall section or projection 16 and its profiling 20, specifically by appropriate redirection, scattering, etc., of the fluid particles impacting this projection 16.

The invention was described in the preceding using one aspect as an example. It is evident that modifications and changes are possible without departing from the fundamental idea of the invention. For example, it is possible to furnish several nozzle openings in succession in the direction of arrow A in the place of one nozzle slit 12, which openings form an array of nozzle openings, the effect of which is the equivalent of the nozzle slit 12. It is furthermore possible to furnish several nozzle slits 12 in succession in the circumferential direction A or offset in the direction of the Y-axis or arrays of nozzle openings.

In the preceding it was assumed that the peripheral surface 4 of the chamber 3 is configured as a circular cylinder shape with a concave curvature. Other concave shapes for the inner peripheral surface of the chamber 3 are conceivable, specifically in the area between the opening 11 and the at least one nozzle slit 12 or a corresponding array of nozzle openings.

It is furthermore possible in at least one nozzle slit 12 or to dispose or configure a corresponding array of several nozzle openings in a helix with reference to the center axis M or to dispose them in a plane which is inclined with respect to the X-Z plane.

What is claimed is:

1. A nozzle device to discharge a fluid, onto vehicle windows and/or lenses of vehicle headlights, having at least one connection furnished at a nozzle body to supply the fluid and having at least one nozzle opening on the nozzle body, which has the characteristics of a slit nozzle and is connected to the fluid connection through a fluid path formed in the interior of the nozzle body, characterized in that at least one rotation chamber is formed in the interior of the nozzle body for the fluid, which chamber has a concave curvature around at least one axis of rotation in at least one partial area of an interior surface bounding the rotation chamber and is enclosed by opposing end wall surfaces, that a mouth of the fluid connection issues eccentrically into the chamber referenced to the axis of rotation, and that the at least one nozzle opening is offset at an angle around the axis of rotation to be substantially non-aligned with respect to the opening of the mouth of the fluid connection.

2. The nozzle device from claim 1, wherein the rotation chamber, at least in a partial area of an inner surface lying between an opening of the fluid connection and the at least one nozzle opening, has a concave configuration.

3. The nozzle device from claim 1, wherein the rotation chamber has a concave configuration over an entire inner surface enclosing the axis of rotation.

4. The nozzle device from claim 1, wherein the rotation chamber, at least on the concave partial area of an inner surface, is configured corresponding to the surface of a body of rotation co-axial with the axis of rotation.

5. The nozzle device from claim 1, wherein the rotation chamber is configured as a circular cylinder shape at least on the concave partial area of its inner surface.

6. The nozzle device from claim 1, wherein the fluid connection forms a passage to supply the fluid, an axis of which passage opens eccentrically into the rotation chamber at the mouth.

7. The nozzle device from claim 1, wherein the fluid connection forms a passage to supply the fluid, and the passage opens into the rotation chamber substantially tangentially referenced to an imaginary circle drawn around the axis of rotation.

8. The nozzle device from claim 1, wherein an opening of the fluid connection and the at least one nozzle opening are provided on the inner surface of the rotation chamber enclosing the axis of rotation.

9. The nozzle device from claim 1, wherein the fluid connection forms a passage to supply the fluid, and the axis of one of the passages of the fluid connection and of the opening lies in a plane substantially perpendicular to the axis of rotation.

10. The nozzle device from claim 1, wherein an opening of the fluid connection and the at least one nozzle opening are furnished offset to each other by an angular amount different than 90°.

11. The nozzle device from claim 1, wherein the nozzle opening is formed by at least one nozzle slit and/or by at least one array of a plurality of nozzle openings.

12. The nozzle device from claim 11, wherein the at least one of the nozzle slit and at least one array of nozzle openings extend over an angular range around the axis of rotation.

13. The nozzle device from claim 11, wherein the at least one of the nozzle slit and the at least one array of nozzle openings are furnished in a plane which lies perpendicular to the axis of rotation and includes an angle with it.

14. The nozzle device from claim 11, wherein one of the at least one nozzle slit and the at least one array of nozzle openings extend along an imaginary helical line around the axis of rotation.

15. The nozzle device from claim 1, characterized by the nozzle device is manufactured from one of metal and plastic.

16. The nozzle device from claim 1, wherein the axis of the fluid connection and the axis of the at least one nozzle opening having the characteristics of a fan lie in a substantially common plane.

17. A nozzle device to discharge a fluid, onto vehicle windows and/or lenses of vehicle headlights, having at least one connection furnished at a nozzle body to supply the fluid and having at least one nozzle opening on the nozzle body, which has the characteristics of a slit nozzle and is connected to the fluid connection through a fluid path formed in the interior of the nozzle body, characterized in that at least one rotation chamber is formed in the interior of the nozzle body for the fluid, which chamber has a concave curvature around at least one axis of rotation in at least one partial area of an interior surface bounding the rotation chamber, that a mouth of the fluid connection issues eccentrically into the chamber referenced to the axis of rotation, and that the at least one nozzle opening is offset at an angle around the axis of rotation with respect to the opening of the mouth of the fluid connection, wherein means to modify the emerging fluid jet are furnished on the outer surface of the nozzle body in the area of the at least one nozzle.

18. The nozzle device from claim 17, wherein the means to modify the fluid jet are formed by a surface extending away from the nozzle body and adjacent the at least one nozzle opening, which surface is one of part of a projection and is profiled.

19. A nozzle device to discharge a fluid, onto vehicle windows and/or lenses of vehicle headlights, comprising:

at least one fluid connection furnished at a nozzle body to supply the fluid;

at least one nozzle opening on the nozzle body, connected to the fluid connection through a fluid path formed in the interior of the nozzle body; and at least one fluid rotation chamber formed the interior of the nozzle body for the fluid, the at least one fluid rotation chamber having a concave curvature surface around at least one axis of fluid rotation in at least one partial area of an interior surface and enclosed by opposing end wall surfaces, a mouth of the fluid connection issuing eccentrically into the chamber referenced to the axis of rotation to be directed by the concave curvature surface, and the at least one nozzle opening offset at an angle around the axis of rotation to be substantially non-aligned with respect to the opening of the mouth of the fluid connection.

20. The nozzle device of claim 19, wherein the fluid connection forms a passage to supply the fluid, and the passage opens into the rotation chamber substantially tangentially referenced to an imaginary circle drawn around the axis of rotation.

* * * * *